(12) United States Patent
Lee et al.

(10) Patent No.: US 9,174,513 B2
(45) Date of Patent: Nov. 3, 2015

(54) HEATING CONTROL METHOD FOR FUEL CELL VEHICLE

(75) Inventors: Seung Yong Lee, Gyeonggi-do (KR);
Chi Myung Kim, Gyeonggi-do (KR);
Eung Young Kim, Gyeonggi-do (KR);
Gi Young Nam, Gyeonggi-do (KR);
Sung Wook Na, Gyeonggi-do (KR);
Hark Koo Kim, Gyeonggi-do (KR);
Kwang Ok Han, Gyeonggi-do (KR);
Kyoon Soo Lim, Gyeonggi-do (KR);
Yong Sun Park, Gyeonggi-do (KR)

(73) Assignees: Hyundai Motor Company, Seoul (KR);
Kia Motors Corporation, Seoul (KR)

( * ) Notice: Subject to any disclaimer, the term of this patent is extended or adjusted under 35 U.S.C. 154(b) by 222 days.

(21) Appl. No.: 13/192,745

(22) Filed: Jul. 28, 2011

(65) Prior Publication Data
US 2012/0122000 A1    May 17, 2012

(30) Foreign Application Priority Data

Nov. 17, 2010    (KR) .................. 10-2010-0114234

(51) Int. Cl.
*H01M 8/04*    (2006.01)
*F25B 27/00*    (2006.01)
(Continued)

(52) U.S. Cl.
CPC .......... *B60H 1/2218* (2013.01); *B60H 1/00392* (2013.01); *H01M 8/0432* (2013.01);
(Continued)

(58) Field of Classification Search
USPC .............................. 903/930–944; 429/433–434
See application file for complete search history.

(56) References Cited

U.S. PATENT DOCUMENTS 5,950,752 A * 9/1999 Lyons ........................ 180/65.22

6,994,931 B2 * 2/2006 Ichikawa et al. ............... 429/429
(Continued)

FOREIGN PATENT DOCUMENTS

JP    2001315524 A    11/2001
JP    2002-219926 A    8/2002
(Continued)

*Primary Examiner* — Ula C Ruddock
*Assistant Examiner* — Osei Amponsah
(74) *Attorney, Agent, or Firm* — Mintz Levin Cohn Ferris Glovsky and Popeo, P.C.; Peter F. Corless

(57) ABSTRACT

The present invention provides a heating control method for a fuel cell vehicle, in which an additional heating source is used together with a typical electric heater to reduce power consumption and increase fuel efficiency as compared to the sole use of the electric heater. For this purpose, the present invention provides a heating control method for a fuel cell vehicle which comprises an electric heater for heating air supplied to the interior of the vehicle, and a heater core provided in a coolant line for cooling a fuel cell stack and heating the air supplied to the interior of the vehicle by heat exchange with the coolant discharged from the fuel cell stack. The method comprises: detecting a state of charge (SOC) of a battery when the interior temperature is lower than a predetermined temperature set by a driver and, if the SOC of the battery is above a predetermined lower limit, heating the interior of the vehicle by operating the electric heater by the power of a battery; heating the interior of the vehicle by operating the electric heater by the power generated by the fuel cell stack, if the SOC of the battery is below the lower limit; heating the interior of the vehicle using both the heater core and the electric heater, if the temperature of the coolant is above a predetermined temperature at which the fuel cell stack does not reach a normal operating temperature; and heating the interior of the vehicle using only the heater core while turning off the electric heater, if the temperature of the coolant is increased above a normal operating temperature of the fuel cell stack.

12 Claims, 4 Drawing Sheets

(51) Int. Cl.
    *B60H 1/02* (2006.01)
    *B60H 1/32* (2006.01)
    *B60H 1/22* (2006.01)
    *B60H 1/00* (2006.01)
    *H01M 16/00* (2006.01)

(52) U.S. Cl.
    CPC ...... *H01M8/04067* (2013.01); *H01M 8/04753* (2013.01); *H01M 16/006* (2013.01); *B60H 1/2225* (2013.01); *H01M 2250/20* (2013.01); *H01M 2250/405* (2013.01); *Y02B 90/16* (2013.01); *Y02E 60/50* (2013.01); *Y02T 90/32* (2013.01)

(56) References Cited

U.S. PATENT DOCUMENTS

2007/0243427 A1* 10/2007 Hayashi et al. ............... 429/13
2009/0140066 A1* 6/2009 Han ..................... 237/12.3 R

FOREIGN PATENT DOCUMENTS

| JP | 2004-146144 | * | 5/2004 | ............ H01M 8/00 |
| JP | 2004-146144 | A | 5/2004 | |
| JP | 2006-059573 | * | 3/2006 | ............ H01M 8/00 |
| KR | 10-2003-0089608 | | 11/2003 | |
| KR | 10-2009-0091388 | | 8/2009 | |
| KR | 10-2010-0042189 | | 4/2010 | |

* cited by examiner

HEATING CONTROL METHOD FOR FUEL CELL VEHICLE

CROSS-REFERENCE TO RELATED APPLICATION

This application claims under 35 U.S.C. §119(a) the benefit of Korean Patent Application No. 10-2010-0114234 filed Nov. 17, 2010, the entire contents of which are incorporated herein by reference.

BACKGROUND (a) Technical Field

The present invention relates to a heating control method for a fuel cell vehicle. More particularly, it relates to a heating control method for a fuel cell vehicle, in which an additional heating source, which uses waste heat of coolant of a fuel cell stack, is used together with a typical electric heater.

(b) Background Art

Internal combustion engines using fossil fuels have many problems such as environmental pollution due to exhaust gas, global warming due to carbon dioxide, respiratory diseases due to increased ozone, etc. Moreover, since the amount of fossil fuels left on earth is limited, they will be exhausted in the near future.

To address the above-described problems, various types of electric vehicles, such as a pure electric vehicle (EV) driven by a drive motor, a hybrid electric vehicle (HEV) driven by an engine and a drive motor, a fuel cell electric vehicle (FCEV) driven by a drive motor using electricity generated by a fuel cell, etc., have been developed.

In an electric vehicle, an electric heater may be used to heat the interior of the vehicle (i.e., the passenger area), unlike an internal combustion engine vehicle which is equipped with a heater that uses hot water heated by waste heat of the engine.

In particular, pure electric vehicles (which use only an electric heater), hybrid electric vehicles (which use both engine waste heat and an electric heater), and fuel cell vehicles (which use only an electric heater) are not equipped with an engine nor do they have a mode in which the engine is stopped. As such, an electric heater is necessarily required to heat the interior of these vehicles.

One example of an electric heater that is widely used is a positive temperature coefficient (PTC) heater. The PTC heater is commonly used as a heating source in a diesel vehicle together with the waste heat of the engine. Since the PTC heater can rapidly generate heat, the interior temperature can be easily increased and the heating can be easily controlled by simple control logic/means.

However, when only the PTC heater (with a maximum capacity of 5 kW, for example) is used in environmentally-friendly vehicles (e.g., pure electric vehicles, fuel cell vehicles, etc.) for heating, it is necessarily driven by and consumes the power of a battery or fuel cell. Thus, the driving distance of the vehicle is reduced.

In the fuel cell vehicle, the PTC heater is operated by the electricity generated in the fuel cell vehicle, i.e., the electricity generated by the fuel cell or the electricity of the battery charged by the power generation of the fuel cell. However, because the fuel cell vehicle is not equipped with an engine, high capacity PTC heaters are generally used, which increase the power consumed for heating the interior of the vehicle (or increases the amount of hydrogen used as a fuel), thereby reducing fuel efficiency.

Moreover, in a conventional heating system using only a high capacity PTC heater, the interior temperature can be rapidly increased, but the maximum heating performance is insufficient. Further, when the vehicle-running wind is used as air for heating in a state where a blower fan is turned off during cold conditions (e.g., in winter) when the ambient temperature is low, the temperature of the surface of the PTC heater is rapidly reduced by heat exchange with the cold outside air even when the PTC heater is operated. As a result, cold air is introduced into the interior of the vehicle.

Another example of an electric heater that has been used is a heat pump system using $CO_2$. However, use of such heat pump systems require a significant change in the structure of the vehicle, which is problematic in terms of high cost and mass production. Moreover, high pressure conditions which are required for the application of such heat pump systems may cause a safety problem.

FIG. 1 shows an example in which a PTC heater is controlled in three stages (1 kW, 3 kW, and 5 kW) according to a change in heating load required to heat the interior of the vehicle in cold conditions (e.g., winter). In particular, the amount of heat generated by the PTC heater varies according to the variation of the heating load to maintain the interior temperature within a predetermined range.

For example, if the interior temperature does not fall within the predetermined range during operation of the heating system, the amount of heat generated by the PTC heater (with a maximum capacity of 5 kW) is increased from 1 kW to 5 kW step by step as shown in FIG. 1.

As such, when only the PTC heater is used to heat the interior of the fuel cell vehicle, in this case the fuel efficiency is significantly reduced by the power consumption of the PTC heater.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art. Accordingly, the present invention provides an improved heating control system and method for a fuel cell vehicle. In particular, the present invention provides a heating control system and method in which an additional heating source is used together with a typical electric heater to thereby reduce power consumption and increase fuel efficiency.

In one aspect, the present invention provides a heating control system for a fuel cell vehicle which comprises an electric heater for heating air supplied to the interior of the vehicle and a heater core. In various embodiments, the electric heater is provided in a coolant line for cooling a fuel cell stack, and is configured to heat the air supplied to the interior of the vehicle by heat exchange with the coolant discharged from the fuel cell stack.

According to another aspect, the present invention provides a heating control method for a fuel cell vehicle comprising: (a) detecting a state of charge (SOC) of a battery when the vehicle interior (i.e., passenger area) temperature is lower than a predetermined temperature which can be set by a driver, (b) if the SOC of the battery is above a predetermined lower limit, heating the interior of the vehicle by operating the electric heater by the power of a battery, (c) if the SOC of the battery is below the lower limit in step (a), heating the interior of the vehicle by operating the electric heater by the power generated by the fuel cell stack, (d) heating the interior of the vehicle using both the heater core and the electric heater, if the temperature of the coolant is above a predetermined temperature at which the fuel cell stack does not reach a normal operating temperature; and (e) heating the interior of the vehicle using only the heater core while turning off the electric heater, if the temperature of the coolant is increased above a normal operating temperature of the fuel cell stack.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not imitative of the present invention, and wherein.

Figure 1:
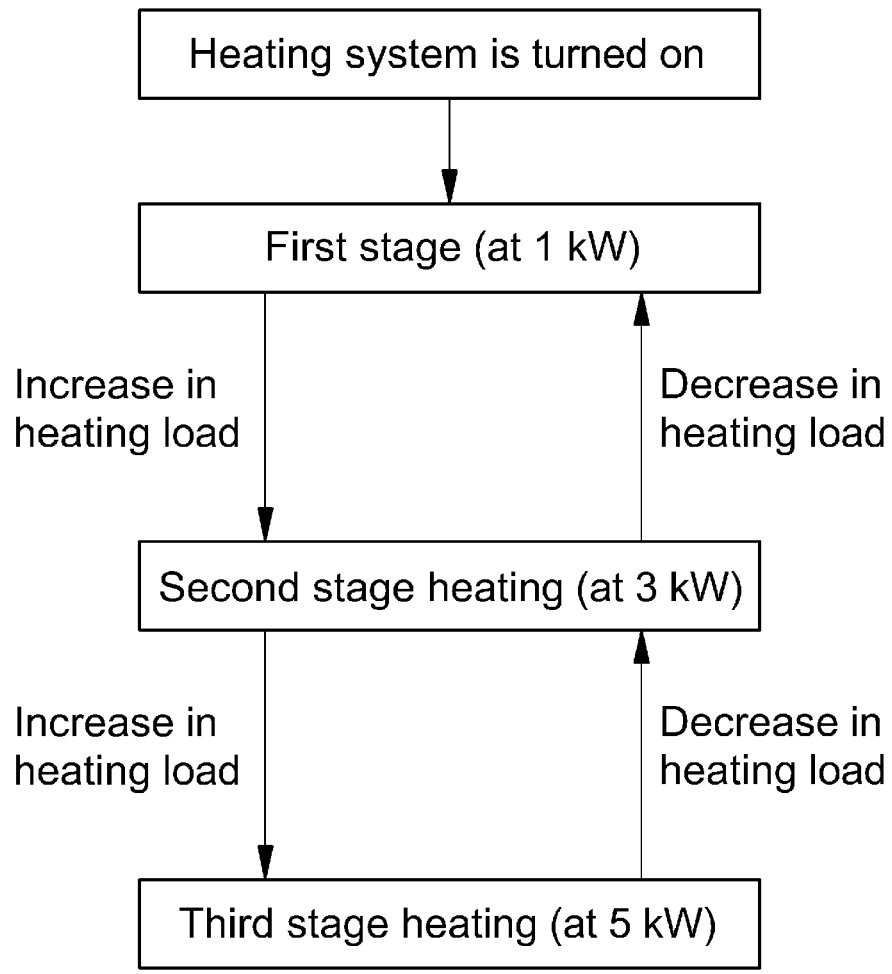
FIG. 1 is a diagram showing an example in which a PTC heater is controlled according to a change in heating load required to heat the interior of a fuel cell vehicle in cold conditions (e.g., winter).

Reference numerals set forth in the Drawings includes reference to the following elements as further discussed below:

| | |
|---|---|
| 1: air conditioning duct | 10: fuel cell stack |
| 21: radiator | 22: coolant line |
| 23: bypass line | 24: a three-way valve |
| 25: coolant pump | 26: bypass line |
| 31: COD | 41: electric heater (PTC heater) |
| 42: a heater core | 43: blower fan |
| 44: damper door | 45: demineralizer |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a heating control system and method for a fuel cell vehicle, in which a heater core through which coolant of a fuel cell stack passes, is used as an additional heating source together with a typical electric heater. As such, waste heat of coolant can be used to heat the interior of the vehicle.

Figure 2:
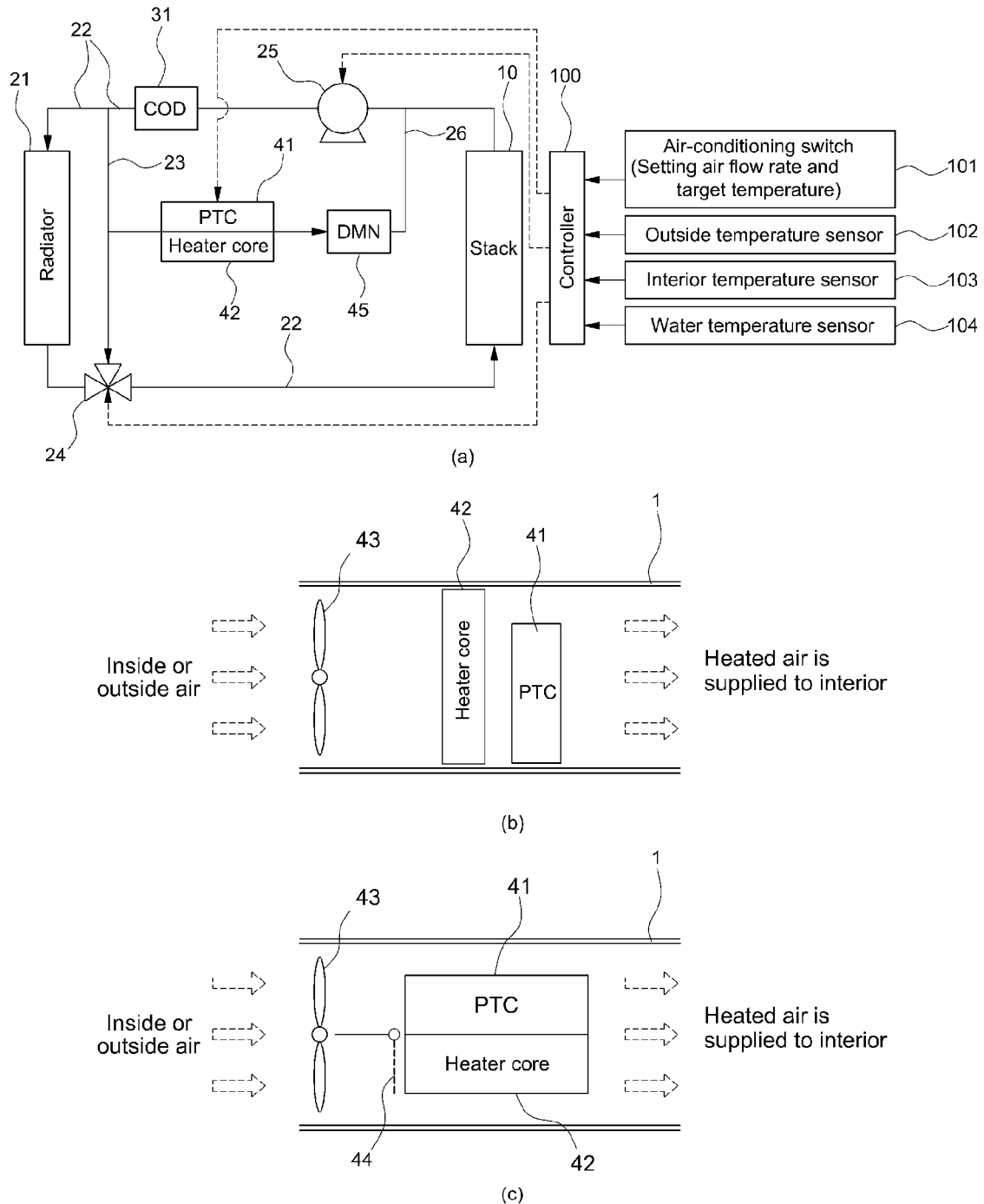
FIG. 2 is a schematic diagram showing the configuration of a heating system for a fuel cell vehicle controlled by a heating control method for a fuel cell vehicle in accordance with a preferred embodiment of the present invention.

FIG. 2 is a schematic diagram showing the configuration of a heating system for a fuel cell vehicle controlled by a heating control method for a fuel cell vehicle in accordance with a preferred embodiment of the present invention. As shown, a heater core 42 is provided through which coolant passes to increase the temperature of air by heat exchange between the air and the coolant.

Referring to FIG. 2, the present invention provides the heater core 42 as an additional heating source that can work together with an electric heater (e.g., a PTC heater) 41. As further shown in FIG. 2, a cooling system is provided and configured for removing reaction heat from a fuel cell stack 10 to the outside of the system and controlling the operating temperature of the fuel cell stack 10.

A cathode oxygen depletion (COD) 31 can further be provided and configured for removing residual oxygen from the fuel cell stack 10, and as further shown, a demineralizer (DMN) 45 can be provided and configured for removing ionic substances contained in the coolant.

As shown in FIG. 2, the cooling system for maintaining the fuel cell stack 10 within an optimum or desired operating temperature range comprises: a radiator 21 configured for radiating heat of the coolant to the outside or the vehicle, a coolant line 22 in connection between the fuel cell stack 10 and the radiator 21 such that the coolant is circulated therethrough, a bypass line 23 and a three-way valve 24 configured to bypass the coolant line 22 such that the coolant does not pass through the radiator 21, and a coolant pump 25 configured for pumping and transporting the coolant to circulate through the coolant line 22.

As shown in this embodiment, the bypass line 23 is a coolant line branched from the coolant line 22 between the upstream and downstream sides of the radiator 21 to allow the coolant to bypass the radiator 21 when desired. It is noted that the bypass line 23 can be configured to bypass all or part of the coolant such that all of the coolant can bypass the radiator 21 or only a portion of the coolant can bypass the radiator 21.

In a preferred embodiment, the three-way valve 24 is an electronic valve, in which a valve actuator is driven by a control signal applied from a controller 100 to switch the coolant flow such that the coolant selectively passes through the radiator 21.

More preferably, the three-way valve 24 may be an electronic valve, in which a step motor is used as the valve actuator. As such, the opening angle of the electronic valve can be controlled by a control signal applied from the controller 100 to control the opening degrees of both passages (including a radiator passage and a bypass passage). In this case, the amount of coolant passing through the radiator 21 and the amount of coolant bypassed can be appropriately distributed.

The coolant pump 25 is configured to circulate the coolant through the coolant line 22 to maintain the temperature of the coolant at a desired and preferably constant level. Thus, for example, when the controller 100 controls the rotational speed of the coolant pump 25 together with the opening angle of the three-way valve 24, the amount of coolant passing through the heater core 42 can be actively controlled. As such, the amount of heat generated by the heater core 42 and the amount of heat supplied to the interior of the vehicle can be controlled.

For example, the rotational speed of the coolant pump 25 and the opening angle of the three-way valve 24 can be controlled in view of the coolant temperature and the operation of the PTC heater which can be detected by a water temperature sensor 104 (i.e., a temperature sensor at a coolant outlet of the fuel cell stack), the interior temperature detected by an interior temperature sensor 103, a predetermined temperature (i.e., a target air-conditioning temperature) set by a driver using an air-conditioning switch 101, etc., during operation of a blower fan 43. The amount of heat supplied by the heater core 42 can, thus, be controlled.

As shown, the COD 31 is provided in the coolant line 22 in connection to both ends of the fuel cell stack 10. The COD 31 is configured to consume power generated by the reaction of hydrogen and oxygen to thereby generate heat energy during shutdown of the fuel cell, thus removing oxygen from the fuel cell stack 10. As a result, it is possible to reduce and even prevent a reduction in durability of the fuel cell stack due to corrosion of catalyst-supported carbon.

In this embodiment, the COD 31 mainly functions to consume the residual fuel in the fuel cell stack 10, and comprises a heating device including a plurality of heater rods for load consumption provided in a housing such that the coolant passes through the inside of the housing and the periphery of the heater rods. Therefore, the COD 31 may be configured as an integrated heater which rapidly heats the coolant (i.e., rapidly increases the temperature of the fuel cell stack to a range where the efficiency is high) such that the power generation of the fuel cell stack is facilitated during initial start-up when the temperature of the fuel cell stack is low, and the power consumption of the fuel cell stack can be maximized.

In this embodiment, the integrated heater has a structure in which the heater rods are inserted into the housing such that the coolant flowing into the housing passes through the periphery of the heater rods and is discharged to the outside of the housing. Thus, the heater rods function as resistors for load consumption and as heaters for rapidly heating the coolant.

The demineralizer 45 can be provided to remove ionic substances contained in the coolant to thereby maintain the ion conductivity of the coolant below a predetermined level. As such, the current of the fuel cell stack can be prevented from leaking through the coolant.

The demineralizer 45 may be provided in a main coolant line between the fuel cell stack 10 and the three-way valve 24 or provided in a bypass line branched from the main coolant line between the fuel cell stack 10 and the three-way valve 24, (i.e., a bypass line 26 branched from the main coolant line 22 between the upstream and downstream sides of the coolant pump 25).

The heater core 42 is provided and configured to heats the air (i.e., the outside or inside air) blown by the blower fan 43 and passing therethrough, like the electric heater 41. When the air suctioned during the operation of the blower fan 43 is introduced into an air-conditioning duct 1 and is supplied to the electric heater 41 and the heater core 42, the air is heated while passing through the electric heater 41 and the heater core 42. The heated air then flows through a duct connected to the interior of the vehicle, and is then supplied to the interior of the vehicle through an outlet of the duct.

In the heater core 42, the coolant after passing through the fuel cell stack 10 passes through tubes of the heater core 42 and exchanges heat with the air passing through the periphery of cooling fins of the heater core 42.

As shown in (b) of FIG. 2, the heater core 42 and the electric heater 41 may be arranged at front and rear sides, respectively. For example, the heater core 42 may be disposed in front of the electric heater 41 and the electric heater 41 is disposed to the rear of the heater core 42 to allow the air blown by the blower fan 43 to sequentially pass through the heater core 42 and the electric heater 41.

In this case, the heater core 42 continuously supplies heat (i.e., coolant waste heat) during operation of the fuel cell stack 10, and thus the air primarily heated by the heater core 42 can be additionally heated by the electric heater 41, even when the vehicle-running wind is used as the air for heating in a state where the blower fan 43 is turned off during running in winter when the ambient temperature is low. As a result, it is possible to prevent the cold air from being introduced into the interior of the vehicle to a certain degree.

Alternatively, as shown in (c) of FIG. 2, the heater core 42 and the electric heater 41 may be arranged adjacent to each other such that the air supplied by the blower fan 43 passes therethrough.

In this case, a damper door 44 may be provided in front of the heater core 42, so as to selectively block the passage at the heater core 42 such that only the air blown by the blower fan 43 can pass through the electric heater 41.

The operation of the damper door 44 can be controlled by the controller 100 such that, for example, the air is not supplied to the heater core 42 by the damper door 44 when only the PTC heater 41 is used as the heating source or when the temperature of the coolant is to be rapidly increased.

When the damper door 44 blocks the passage at the heater core 42, the air flow to the heater core 42 is blocked during operation of the blower fan 43 and the heat exchange between the coolant and the air is not performed in the heater core 42. As a result, there is a rapidly increase in the coolant temperature.

In the present invention, the electric heater 41 may be any conventional electric heater such as a PTC heater.

According to various embodiments the present invention, the heater core 42 which is used as an additional heating source is provided at a position where the coolant discharged from the fuel cell stack 10 passes, (i.e., at the downstream side of the fuel cell stack 10 in the coolant circulation path) such that the temperature of the air for heating the interior of the vehicle (i.e., the air blown by the blower fan and supplied to the interior of the vehicle) is increased using waste heat of the coolant discharged from the fuel cell stack 10.

That is, the heater core 42 can be provided at the downstream side of the fuel cell stack 10 such that the waste heat of the coolant can be used to heat the interior of the vehicle. Therefore, the coolant which is heated while the fuel cell stack 10 is cooled can be used as a heating medium of the heater core 42.

In other embodiments, the heater core 42 may be provided in the bypass line 26 where the demineralizer 45 is provided.

For example, the bypass line 26 can be branched from the main coolant line 22 between the upstream and downstream sides of the coolant pump 25 and the COD 31. The heater core 42 and the demineralizer 45 can be provided in the bypass line 26 connected between the upstream and downstream sides. Preferably, the heater core 42 may be provided on the upstream side of the demineralizer 45 in the coolant circulation path. This can be beneficial because the demineralization performance of an ion-exchange resin disposed in the demineralizer 45 is reduced at high temperature. Therefore, the demineralizer 45 is preferably provided at the rear of the heater core 42 such that the coolant, whose heat is transferred to the air for heating the interior of the vehicle, (i.e., the coolant cooled by the heat exchange with the air in the heater core 42) is introduced into the demineralizer 45.

Moreover, the COD 31 is preferably provided at the downstream side of the coolant pump 25, and the heater core 42 is preferably provided at the downstream side of the coolant pump 25 and the COD 31 in the coolant circulation path. As such, the coolant sequentially passing through the coolant pump 25 and the COD 31 then passes through the heater core 42.

As will be described later, the COD 31 converts electrical energy generated by the fuel cell stack 10 into heat to increase the temperature of the coolant. The coolant heated by the COD 31 should be transferred to the heater core 42 during operation of the heating system (when the heating load is required) and when the fuel cell is in an idle stop mode. Therefore, it is preferred to dispose the COD 31 at the upstream side of the heater core 42 in the coolant circulation path.

Moreover, the coolant heated by the COD 31 should be cooled by the radiator 21 when the heating system is not operating (e.g. in warm conditions such as the summer), and thus the coolant passing through the COD 31 should be capable of selectively passing through the radiator 21.

Thus, for example, the coolant line 22 in which the radiator 21 is provided, and the bypass line 23 configured to allow the coolant to bypass the radiator 21, can be branched from the outlet side of the COD 31 (i.e., at the downstream side in the coolant circulation path) such that the coolant passing through the COD 31 passes through the radiator 21 or does not pass through the radiator 21.

As a result, the high temperature coolant discharged from the fuel cell stack 10 sequentially passes through the coolant pump 25, the COD 31, the hater core 42, and the demineralizer 45. Otherwise, the coolant passing through the COD 31 passes through the radiator 21 to be cooled according to the opening degree of the three-way valve 24.

In this structure, in a state where the three-way valve 24 cuts off the coolant passage at the radiator 21 such that the coolant is not circulated through the radiator 21 during the heating of the interior, the high temperature coolant discharged from the coolant outlet of the fuel cell stack 10 can be further heated by the shaft horse power of the coolant pump 25 and then introduced into the heater core 42.

Figure 3:
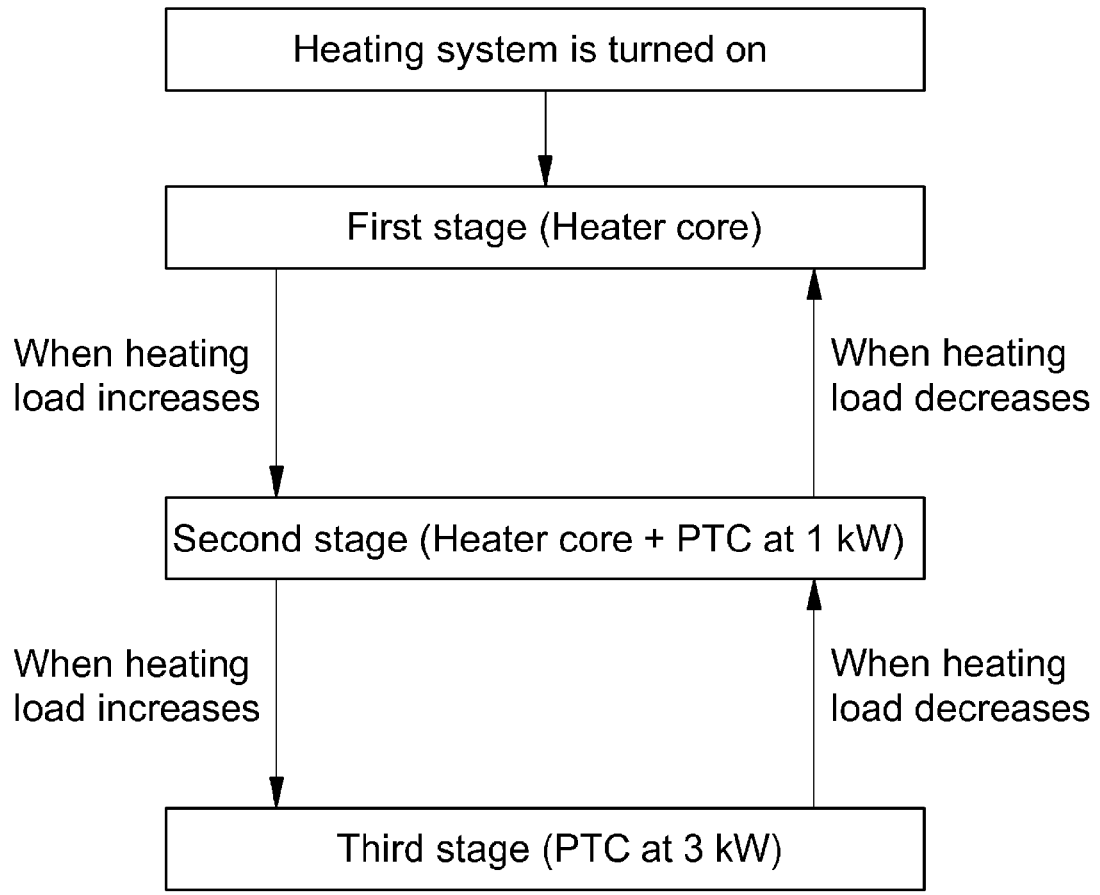
FIGS. 3 and 4 are diagrams showing a heating control method for a fuel cell vehicle in accordance with a preferred embodiment of the present invention.
Figure 4:
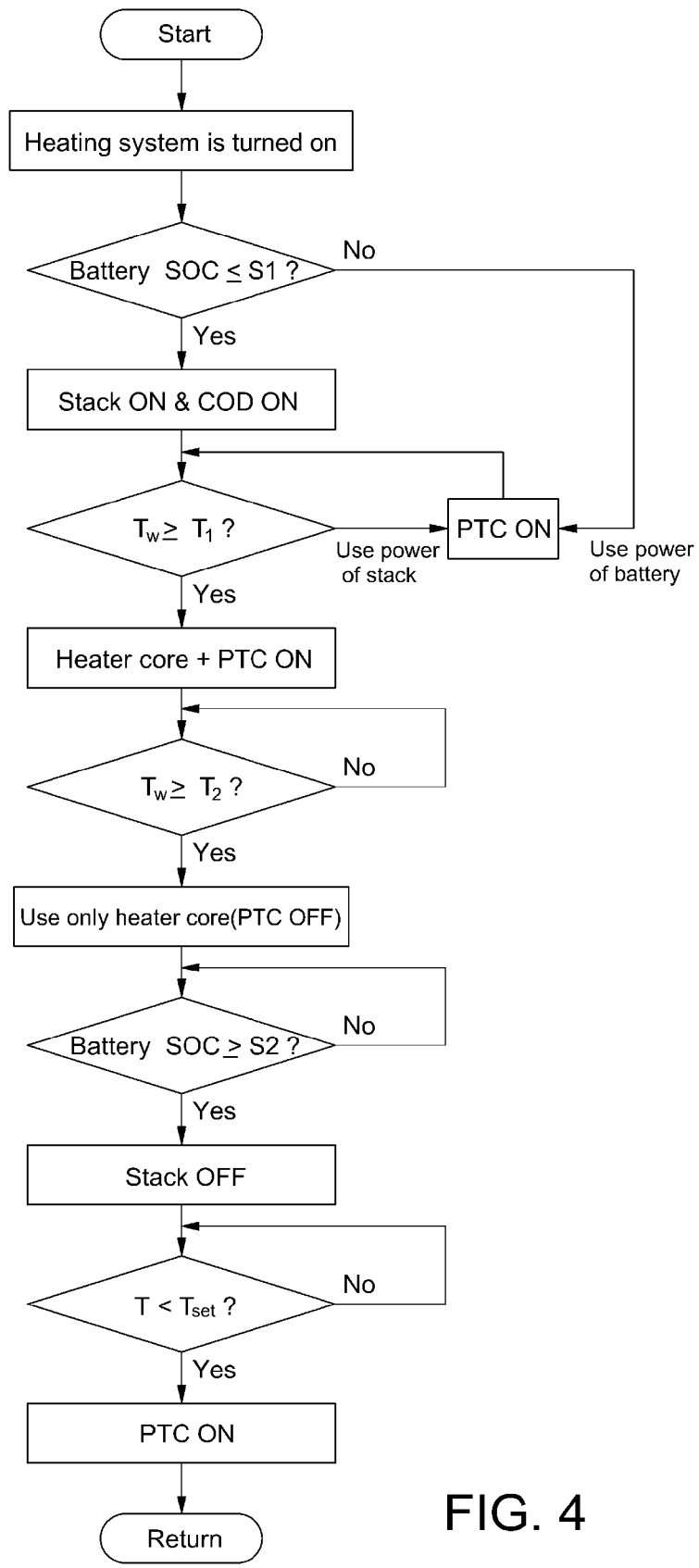

Meanwhile, FIGS. 3 and 4 are diagrams showing a heating control method for a fuel cell vehicle in accordance with the present invention, which will be described with reference to the above-described heating system. First, as shown in FIG. 3, when the vehicle is running and the fuel cell stack normally operates, the heating system can be controlled in any one of three stages, such as a first stage in which only the heater core 42 is operated, a second stage in which both the heater core 42 and the PTC heater 41 are operated together, and a third stage in which only the PTC heater 41 is operated, according to a change in heating load required to heat the interior of the vehicle.

Here, when the heating load is at the lowest level, the heating system is controlled in the first stage (where only the heater core is used). As the heating load is increased, the heating system is controlled in the second stage (where both the heater core and the PTC heater at 1 kW are both used), or in the third stage (where only the PTC heater at 3 kW is used).

Moreover, as the heating load is reduced, the heating system can be controlled in the order from the third to first stages.

However, the output of the PTC heater 41 in the third stage is increased compared to that in the second stage. As such, the amount of heat generated by the PTC heater 41 is increased in the third stage (3 kW) where only the PTC heater 41 is used, as compared to the second stage (1 kW) where the heater core 42 is used as an additional heating source.

In the third stage where only the PTC heater 41 is used, the controller 100 can control the damper door 44 shown in FIG. 2 so as to locate it at a position (shown by a dotted line in FIG. 2) to block the passage at the heater core 42. As a result, the air blown by the blower fan 43 can pass only through the PTC heater 41.

Moreover, as mentioned above, when the heater core 42 is used during operation of the blower fan 43, the rotational speed of the coolant pump 25 and the opening angle of the three-way valve 24 can be controlled in view of the coolant temperature and the operation of the PTC heater which are detected by the water temperature sensor 104, the interior temperature detected by the interior temperature sensor 103, a predetermined temperature set by a driver using the air-conditioning switch 101, etc. Thus, the amount of heat supplied by the heater core 42 can be controlled.

As such, according to the present invention, the heater core 42 is used as an additional heating source such that the PTC heater 41 can be operated at 1 kW in the second stage and at 3 kW in the third stage. Therefore, the power of 2 kW, which is insufficient compared to that of FIG. 1, can be covered by the waste heat of the coolant using the heater core 42. Thus, the capacity of the PTC heater 41 can be relatively reduced.

In particular, according to the present invention, a PTC heater with a capacity of 3 kW can be used instead of a PTC heater with a maximum capacity of 5 kW. Moreover, the insufficient heating load can be covered by the waste heat of the coolant, and thus the output and the power consumption of the PTC heater can be reduced, thereby improving fuel efficiency.

Next, an idle stop mode will be described with reference to FIG. 4.

In the following description, the main control unit of the COD and the fuel cell stack may be a fuel cell system controller (not shown), and the controller denoted by reference numeral 100 in FIG. 2 may be an air-conditioning controller. Moreover, the control process of the present invention may be performed under the cooperative control of the fuel cell system controller, the air-conditioning controller, a battery management system BMS [transmitting the state of charge (SOC) of a battery, not shown], etc.

First, in an idle stop, after the heating system is turned on when the heating load is required as the interior temperature T detected by the interior temperature sensor 103 is lower than a predetermined temperature $T_{set}$ set by a driver using the air-conditioning switch 101, the air-conditioning controller 100 first detects the SOC of the battery (not shown), transmitted from the battery management system.

Here, if the SOC of the battery is above a predetermined lower limit S1, the PTC heater 41 is operated by the power of the battery.

On the other hand, if the SOC of the battery is lower than the lower limit S1, the PTC heater 41 cannot be operated by the power of the battery, and thus reactant gases are supplied to the fuel cell stack 10 to initiate the operation of the fuel cell stack 10. Then, the COD 31 is operated to increase the temperature of the coolant to prevent local deterioration of the fuel cell stack 10.

Here, if the coolant temperature Tw detected by the water temperature sensor 104 (i.e., the temperature sensor at the coolant outlet of the fuel cell stack) is below a predetermined temperature at which the fuel cell stack 10 does not reach a normal operating temperature, (i.e., below a maximum temperature T1 which can be increased by the COD 31, such as, for example, a predetermined temperature of 58° C.) the PTC heater 41 is operated by power generated by the fuel cell stack 10. In this case, only the PTC heater 41 is used to heat the interior of the vehicle, and the output of the PTC heater 41 is appropriately controlled to a maximum of 3 kW according to the heating load.

Then, if the coolant temperature Tw is increased above the maximum temperature T1 by the heat of the fuel cell stack 10 and the COD 31, the heater core 42 is used together with the PTC heater 41 to heat the interior of the vehicle and, even in this case, the output of the PTC heater 41 is appropriately controlled according to the heating load.

Thereafter, if the coolant temperature Tw is increased above a normal operating temperature T2 of the fuel cell stack 10 (as a predetermined temperature, 65° C., for example), the PTC heater 41 is turned off, and only the heater core 42 is used to heat the interior of the vehicle.

During the use of the heater core 42, the rotational speed of the coolant pump 25 and the opening angle of the three-way valve 24 can be controlled in view of the coolant temperature Tw, the operation of the PTC heater, the interior temperature T, and the predetermined temperature $T_{set}$. Thus, the amount of heat supplied by the heater core 42 can be controlled.

Subsequently, if the SOC of the battery, which is charged by the power generated by the fuel cell stack 10, is above a predetermined reference value S2 (i.e., in a full charge state), the operation of the fuel cell stack 10 is turned off and, when the interior temperature T is lower than the predetermined temperature $T_{set}$, the PTC heater 41 is additionally operated by the power of the battery.

The above-described control process can be applied even during initial start-up of the fuel cell. If the heating load is required after the operation of the fuel cell stack 10 is initiated, the SOC of the battery is detected and, if the SOC of the battery is above the lower limit S1, the PTC heater 41 is operated by the power of the battery. Otherwise, if the SOC of the battery is below the lower limit S1, the PTC heater 41 is operated by the power of the fuel cell stack 10.

Even in this case, if the coolant temperature Tw is less than the maximum temperature T1 during operation of the COD 31, only the PTC heater 41 is used to heat the interior of the vehicle, and the output of the PTC heater 41 is appropriately controlled to a maximum of 3 kW according to the heating load.

Then, if the coolant temperature Tw is continuously increased above the maximum temperature T1 by the heat of the fuel cell stack 10 and the COD 31, the heater core 42 is used together with the PTC heater 41 to heat the interior of the vehicle, and the output of the PTC heater 41 is appropriately controlled according to the heating load.

Moreover, if the coolant temperature Tw is increased above the normal operating temperature T2 of the fuel cell stack 10, the PTC heater 41 is turned off, and only the heater core 42 is used to heat the interior of the vehicle.

Further, the rotational speed of the coolant pump 25 and the opening angle of the three-way valve 24 can be controlled in view of the coolant temperature Tw, the operation of the PTC heater, the interior temperature T, and the predetermined temperature $T_{set}$. Thus, the amount of heat supplied by the heater core 42 can be controlled.

As described above, the heating control method for the fuel cell vehicle according to the present invention provides numerous advantages.

The heater core, which increases the temperature of the air for heating the interior of the vehicle using the waste heat of the coolant discharged from the fuel cell stack, is used as an additional heating source together with the electric heater. Thus, it is possible to address the problem of excessive power consumption due to the sole use of the electric heater, and to improve the fuel efficiency of the fuel cell vehicle.

Further, the heating control method of the present invention can be implemented by providing the heater core for using the waste heat of the coolant in the coolant line and adding control logic. Thus, it is possible to address the problems with conventional systems and methods while minimizing the change in the system and its cost.

Moreover, since both the electric heater and the heater core are used together, it is possible to rapidly increase the interior temperature and, at the same time, provide excellent heating performance.

Furthermore, it is possible to implement various control logics with the use of the COD, which can rapidly increase the temperature of the coolant, and the existing electric heater. Therefore, it is possible to control the rotational speed of the coolant pump and the opening degree of the three-way valve, and thus it is possible to optimally control the amount of coolant and the amount of heat supplied by the heater core, thereby maximizing the heating efficiency.

Especially, the present invention can more precisely control the amount of heat required to rapidly increase the interior temperature to a predetermined temperature desired by a driver, thereby improving the air-conditioning efficiency.

In addition, in the idle stop mode (where the operation of the fuel cell stack is stopped), when the power of the battery is insufficient in the conventional heating system, the fuel cell stack can be operated to charge the battery and, at the same time, the electric heater can be driven by the power of the fuel cell stack. Further, in the present invention, the waste heat of the coolant can be used to heat the interior of the vehicle by the heater core, even while the temperature of the fuel cell stack is increased to a normal operating temperature, thereby maximizing the energy utilization.

Additionally, in the heating control method according to the present invention, any insufficient amount of heat can be covered/compensated by the waste heat of the coolant (i.e., the waste heat of the fuel cell stack, in other words, the fuel cell stack is used as the heating source) using the heater core, and thus the capacity and size of the electric heater can be reduced.

Moreover, the safety risk due to the high pressure conditions required for the use of conventional heat pump systems, and the high voltage conditions required for the use of conventional high capacity electric heaters can be reduced.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A heating control method for a fuel cell vehicle which comprises a coolant line for cooling a fuel cell stack, an electric heater for heating air supplied to the interior of the vehicle, a coolant pump that pumps and transports coolant to circulate through the coolant line, a cathode oxygen depletion (COD) provided at a downstream side of the coolant pump in the coolant line, a bypass line branched from the coolant line between a upstream side of the coolant pump and a downstream side of the COD, and a heater core additionally provided in the bypass line at downstream sides of the coolant pump and the COD and provided together with the electric heater for heating air supplied to the interior of the vehicle by heat exchange with the coolant discharged from the fuel cell stack, the method comprising:
- (a) detecting a state of charge (SOC) of a battery when an interior temperature of the vehicle is lower than a predetermined temperature set by a driver;
- (b) when the SOC of the battery is above the predetermined lower limit, heating the interior of the vehicle by operating the electric heater by power of the battery;
- (c) when the SOC of the battery is below the predetermined lower limit, heating the interior of the vehicle by operating the electric heater by power generated by the fuel cell stack and when a temperature of the coolant is above a predetermined temperature at which the fuel cell stack does not reach a normal operating temperature, heating the interior of the vehicle using both the heater core and the electric heater; and
- (d) when the temperature of the coolant is increased above a normal operating temperature of the fuel cell stack, heating the interior of the vehicle using only the heater core while turning off the electric heater, wherein when the fuel cell stack is in an idle stop mode in step (b), operation of the fuel cell stack is initiated by supplying reactant gases to the fuel cell stack, wherein the temperature of the coolant is increased by operating the COD, the COD heats the coolant and, at a same time, removes the residual oxygen from the fuel cell stack, wherein the coolant sequentially passing through the coolant pump, the COD and then through the heater core, and wherein the COD is at the upstream side of the heater core in a coolant circulation path and the heater core receives coolant that has been heated by the COD prior to being received by the heater core.

2. The method of claim 1, wherein if the SOC of the battery is fully charged by the power generated by the fuel cell stack, turning off the operation of the fuel cell stack and operating the electric heater by power of the battery.

3. The method of claim 1, wherein if the temperature of the coolant is below a predetermined temperature at which the fuel cell stack does not reach a normal operating temperature in step (c), operating only the electric heater by power generated by the fuel cell stack.

4. The method of claim 1, wherein the predetermined temperature at which the fuel cell stack does not reach a normal operating temperature is a maximum temperature of the coolant which can be increased by operating a cathode oxygen depletion (COD).

5. The method of claim 3, wherein the predetermined temperature at which the fuel cell stack does not reach a normal operating temperature is a maximum temperature of the coolant which can be increased by operating a cathode oxygen depletion (COD).

6. The method of claim 1, wherein steps (a) to (d) are performed during initial start-up of a fuel cell, in which the temperature of the coolant is increased by operating a cathode oxygen depletion (COD) after the operation of the fuel cell stack is initiated.

7. The method of claim 1, wherein when the vehicle is running and the fuel cell stack normally operates, the heating of the interior of the vehicle is controlled in any one of a first, second or third stage according to a change in heating load required for the heating of the interior of the vehicle, wherein in the first stage only the heater core is operated, in the second stage both the heater core and the electric heater are operated together, and in the third stage only the electric heater is operated.

8. The method of claim 1, wherein when the heater core is used, the rotational speed of a coolant pump provided in the coolant line, and the opening angle of a three-way valve provided in the coolant line, are controlled based on the temperature of the coolant, the operation of the electric heater, the interior temperature, and the predetermined temperature set by the driver, thereby controlling the amount of the coolant passing through the heater core and the amount of heat supplied by the heater core.

9. The method of claim 7, wherein when the heater core is used, the rotational speed of a coolant pump provided in the coolant line, and the opening angle of a three-way valve provided in the coolant line, are controlled based on the temperature of the coolant, the operation of the electric heater, the interior temperature, and the predetermined temperature set by the driver, thereby controlling the amount of the coolant passing through the heater core and the amount of heat supplied by the heater core.

10. A heating control system for a fuel cell vehicle which comprises:
- a coolant line for cooling a fuel cell stack;
- an electric heater configured in the system to heat air supplied to an interior of the vehicle;
- a coolant pump that pumps and transports coolant to circulate through the coolant line;
- a cathode oxygen depletion (COD) provided at a downstream side of the coolant pump in the coolant line;
- a bypass line branched from the coolant line between a upstream side of the coolant pump and a downstream side of the COD;
- a heater core additionally provided in the bypass line at the downstream sides of the coolant pump and the COD and together with the electric heater, the heater core configured to heat air supplied to the interior of the vehicle by heat exchange with the coolant discharged from the fuel cell stack;

wherein the COD is disposed between the coolant pump and the heater core in a coolant circulating path, such that the coolant sequentially passes through the coolant pump and the COD then passes through the heater core, wherein the electric heater is driven by power from a battery or power from the fuel cell stack depending upon the state of charge (SOC) of the battery;

wherein a temperature of the coolant is increased by operating the COD, the COD heats the coolant and, at a same time, removes residual oxygen from the fuel cell stack, and wherein the heater core receives coolant that has been heated by the COD prior to being received by the heater core.

11. The A heating control system of claim 10 wherein the electric heater and heater core are configured such that if a temperature of the coolant is above a predetermined temperature at which the fuel cell stack does not reach a normal operating temperature, both the heater core and the electric heater heat the interior of the vehicle; and if the temperature of the coolant is increased above a normal operating temperature of the fuel cell stack, only the heater core heats the interior of the vehicle.

12. A fuel cell vehicle having the heating control system of claim 10.

* * * * *